United States Patent
Johnson et al.

(10) Patent No.: US 7,051,938 B2
(45) Date of Patent: May 30, 2006

(54) SYSTEM AND METHOD FOR A MULTI-DIRECTIONAL IMAGING SYSTEM

(75) Inventors: Kevin W. Johnson, Mundelein, IL (US); Roger W. Harmon, Crystal Lake, IL (US); John C. Pincenti, Des Plaines, IL (US); Paul J. Smith, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 113 days.

(21) Appl. No.: 10/747,831

(22) Filed: Dec. 29, 2003

(65) Prior Publication Data
US 2005/0139672 A1    Jun. 30, 2005

(51) Int. Cl.
*G06K 7/10* (2006.01)

(52) U.S. Cl. .................. 235/462.39; 235/462.33; 235/462.36

(58) Field of Classification Search ........... 235/462.33, 235/462.36, 462.37, 462.38, 462.39, 462.4, 235/454
See application file for complete search history.

(56) References Cited

U.S. PATENT DOCUMENTS

| | | | | | |
|---|---|---|---|---|---|
| 2,257,081 | A | * | 9/1941 | Whitman | 396/342 |
| 5,318,257 | A | * | 6/1994 | Tani | 248/125.1 |
| 5,526,041 | A | * | 6/1996 | Glatt | 348/143 |
| 6,019,524 | A | * | 2/2000 | Arbuckle | 396/427 |
| 6,685,366 | B1 | * | 2/2004 | Corbin | 396/427 |

* cited by examiner

*Primary Examiner*—Karl D. Frech
(74) *Attorney, Agent, or Firm*—Matthew C. Loopnow

(57) ABSTRACT

An electronic device (100) and a method for use thereof having an integral camera (102) for taking pictures from multiple sides of the electronic device. The electronic device (100) has a case (101) and a moveable assembly (108) for allowing the camera (102) to capture images from multiple angles with respect to the case depending on the position of the moveable assembly (108). A lens (122) may be used to correct or adjust the image. The camera (102) or electronic device electronics may be used to reverse an image when an odd number of mirrors (206), (208) are used to direct light to the camera (102).

18 Claims, 9 Drawing Sheets

SYSTEM AND METHOD FOR A MULTI-DIRECTIONAL IMAGING SYSTEM

TECHNICAL FIELD

This disclosure relates in general to electronic devices comprising image capture devices and more specifically to a system and method for a multi-directional imaging system.

BACKGROUND

Electronic devices with embedded imaging systems, particularly cellular telephones and personal digital assistants with digital cameras are known. Devices with the ability to capture an image and immediately send it to friends and family have been a commercial success for device manufacturers and network service providers alike. Current devices in this arena are limited to taking pictures from a single direction, requiring that the electronic device be turned to face the subject, either by turning the whole device or by pivoting the outer case of the device. This often proves to be inconvenient and limiting.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
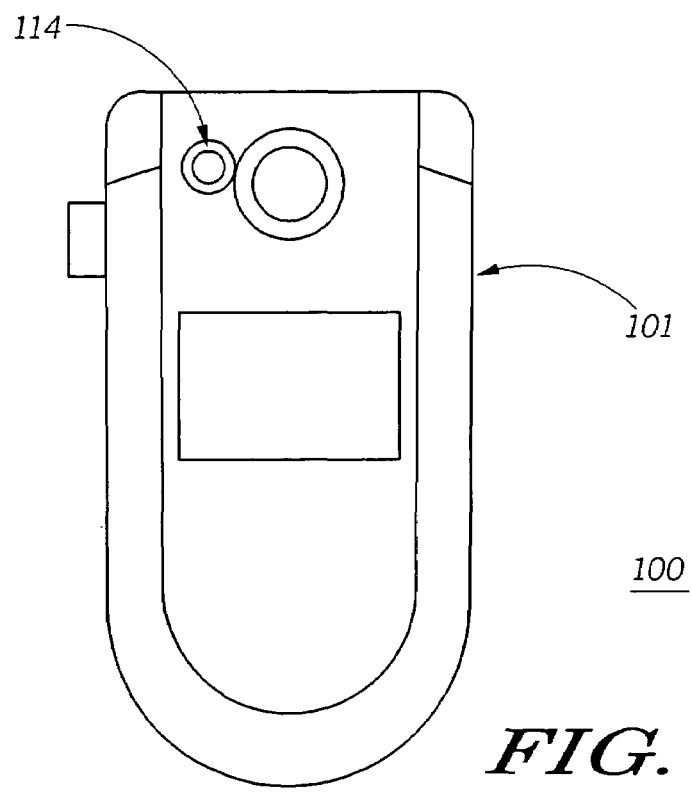
FIG. 1 depicts, in a simplified and representative form, a diagram of an electronic device.

In overview, the present disclosure concerns cameras and other imaging systems for use in electronic devices, for example, consumer wireless communication devices. More particularly, various inventive concepts and principles are embodied in methods and apparatus for the use of such cameras to improve the usability and convenience, and entertainment value of an electronic device having such equipment. The electronic devices of interest may have the ability to communicate wirelessly but it is not necessary. The cameras or other imaging devices contemplated may be integral to the electronic device or may be instantiated as an add-on module.

As further discussed below various inventive principles and combinations thereof are advantageously employed to allow a user to capture a front view image as well as capturing a self-view. One embodiment allows a user to capture an imaging combining the front-view and the self-view either as a split screen or as an overlay. A lever or dial connected to a mechanism can be employed to select light from one of several apertures to enter the camera. In one embodiment, where mirrors are used, the inherent features of a digital camera can be used to invert (i.e. take a mirror image) of an image when an odd number of mirrors is used in directing light from the aperture to the camera that would otherwise leave the image in an incorrect state.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

FIG. 1 shows an electronic device 100 having a generally hollow case 101 and a front aperture 114 for allowing light to enter the case 101 and strike an embedded camera (not shown). The electronic device 100 may be any of a number of handheld or portable electronic devices such as wireless communication devices, cellular phones, personal digital assistants, and organizers that may now or in the future comprise digital cameras.

Figure 2:
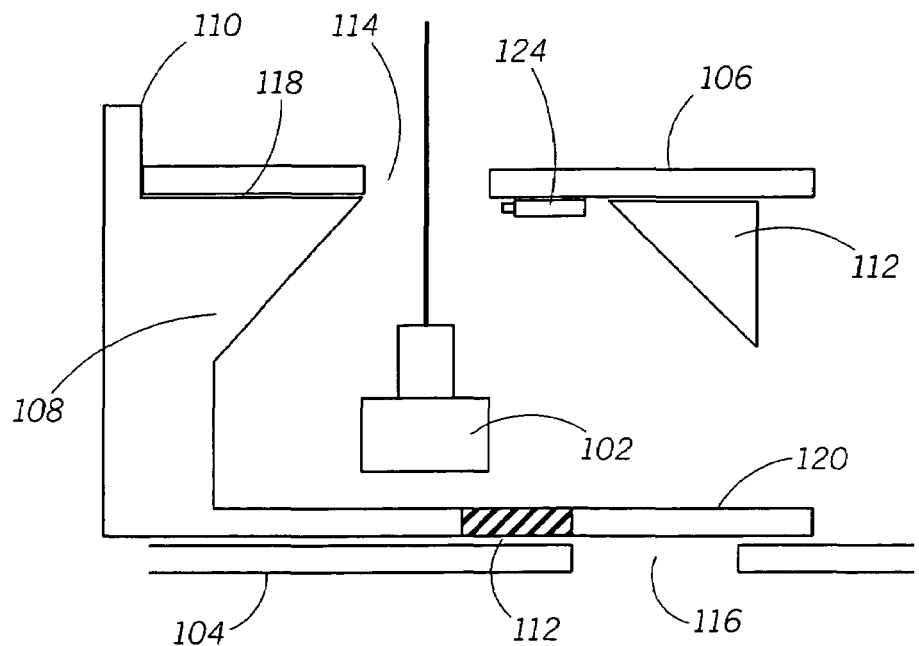
FIG. 2 depicts, in a simplified and representative form, a diagram of a portion of an electronic device showing a camera and moveable assembly in a first position.

Referring to FIG. 2, a simplified and representative diagram of a portion of an electronic device showing a camera and moveable assembly in a first position is discussed and described. The electronic device 100 has a camera 102 mounted inside the case 101 having a rear housing 104 and a front housing 106. Internal to the case 101 and slideably attached thereto is a movable assembly 108. The moveable assembly may have a thumb tab 110 protruding through either housing 104, 106 or may incorporate another mechanism for adjusting the movable assembly 108 from a first position to a second position (shown in FIG. 3). A mirror mount 112 is coupled to one of the housings 104, 106. The front and rear housings 104, 106 also are formed respectively, with a front aperture 114, and a rear aperture 116, both of the apertures 114, 116 for allowing light to enter the electronic device housing 104, 106 to expose images in the camera 102. The movable assembly 108 has a first panel 118 for covering the front aperture 114 when in the second position. The movable assembly 108 also has a second panel 120 for covering the second aperture 116 when the movable assembly 108 is in the first position. An optional lens 122 allows light to enter the housing 104, 106 when the movable assembly 108 is in the second position.

A sensor 124 may be mounted inside the housing 104, 106 for determining the position of the movable assembly 108. The case 101 may have side panels (not depicted) connecting the back housing 104 and the front housing 106 or the front and back housings may have a curved shape forming side regions. In some embodiments, due to the presence of the camera 102, the entire housing may be light-proof except for the designated apertures. The movable assembly 108 is most often attached slidably inside the electronic device 100 on rails or slots, and would in many cases have a detent (not depicted) to aid is setting the position of the movable assembly 108.

The mirror mount 112 may be connectively coupled to the front housing 106, or in some embodiments, could be connected to the movable assembly 108 or any other element of the electronic device 100 suitable for holding the mirror mount 112. All that is required is for the path of light to be optically coupled to a light sensitive device such as a charge coupled device ("CCD") or Complementary Metal Oxide Semiconductor (CMOS) sensor. The electronics of the camera 102 or other image sensor can be mounted anywhere inside the electronic device 100 where space and power connections allow.

The constituent elements of the electronic device 100 are known and available. The overall electronic device 100, the movable assembly 108, and the mirror mount 112 are constructed of molded plastic, molded powdered metal, and/or formed metal or plastic as is common with electronic devices, particularly wireless communication devices, cellular phones, personal digital assistants, and organizers that may now or in the future comprise digital cameras. The actual construction of the electronic device 100 and its constituent elements is common practice in the art and requires only ordinary skill to design and manufacture. The apertures 114 and 116 may have a protective covering such as glass or plastic and such coverings, if present, may have optical corrective properties. The sensor 124 for determining the position of the movable assembly 108 may be a microswitch, an optical sensor or the like. The camera 102 is similar to devices in current manufacturer and use in other electronic devices and requires no elemental modification or special requirements for use in this application. The mirrors 126, 128 may be glass or another base with a highly reflective surface. The reflective surface should be on a front surface of each mirror 126, 128 to reduce double images resulting from light reflecting from both the front and rear surfaces of the mirror. In one embodiment the mirrors 126, 128 may be prismatic lenses such as those available from Anchor Optics of Barrington, N.J. Prisms may be easier to mount, less prone to corrosion or surface dirt and more durable. While mirrors and prismatic lenses are discussed any light redirection apparatus or combination including light pipes may be used.

In operation, when the movable assembly 108 is in the first position, light enters the first aperture 114 and contacts or strikes the camera 102. When so activated, the camera 102 is able to capture an electronic image representing the scene in front of the camera 102. The movable assembly 108 may be part of or associated with a cover (not depicted) that is used to protect the camera 102 and other internal mechanisms of the electronic device 100 when not in operation, although a secondary cover mechanism could be used that is not associated with the movable assembly 108. When in the first position, that is, allowing light to enter the front of the camera, the second panel 120 may cover the rear aperture 116 in a manner so as to prevent light from entering the camera and degrading the image taken from the front.

Figure 3:
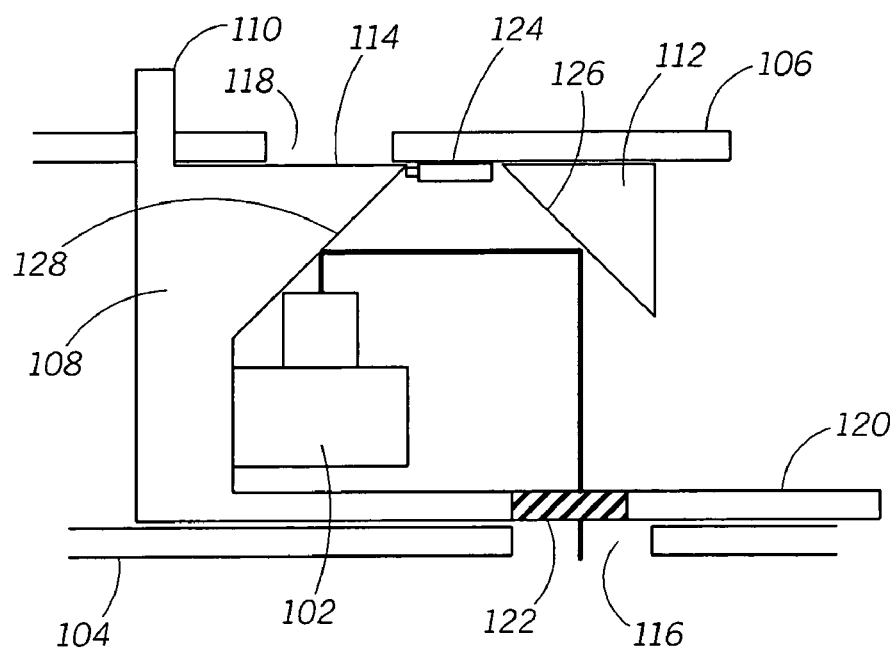
FIG. 3 depicts, in a simplified and representative form, a diagram of a portion of an electronic device showing a camera and moveable assembly in a second position.

Referring to FIG. 3, the electronic device 100 is shown with the movable assembly 108 in a second position. Light enters the camera through lens 122, strikes a mirror 126 mounted on the mirror mount 112 and is directed from the mirror 126 to a mirror 128 on the movable assembly 108, and is from there directed into the lens and light sensing area of the camera 102. The movable assembly 108 may have a first panel 118 that blocks light from entering the first aperture 114 when the moveable assembly is in the second position. Blocking the first aperture 114 reduces light infiltration that may degrade an image being captured through the rear aperture 116. The camera 102 has two modes or the moveable assembly 108 has two positions or both corresponding to the position of the moveable assembly 108. The sensor 124 operates to notify the camera electronics which mode is appropriate for a given position of the moveable assembly 108. This may be useful in adjusting the image to a different focal length or size, for example, when taking a picture of the user of the electronic device 100 who may be closer than subjects in front of the electronic device 100. Alternately, as in cases discussed below, the sensor 124 may signal the camera 102 to invert the image should the optics require that.

The lens 122 may be flat but to correct for focal length, image size or expected distance from the camera, the lens 122 may be convex, concave, or prismatic to adjust for internal optics or for other purposes of adjusting the image. In another embodiment, rather than the lens having a curved shape, one of the mirrors 126, 128 can be curved to provide the optical path adjustment that may be desired in some situations. In the preferred embodiment, at least one of the mirrors 126, 128 is attached to the movable assembly 108. In most embodiments, it is expected that visible light and scenes or objects in front or behind the camera are used as the image. In some embodiments, it could be expected that the light is not actually visible light but could be infrared or could be visible but not an image such as laser light from a barcode scanner, in which case the camera may not have a CMOS sensor but some other light sensitive device.

Figure 4:
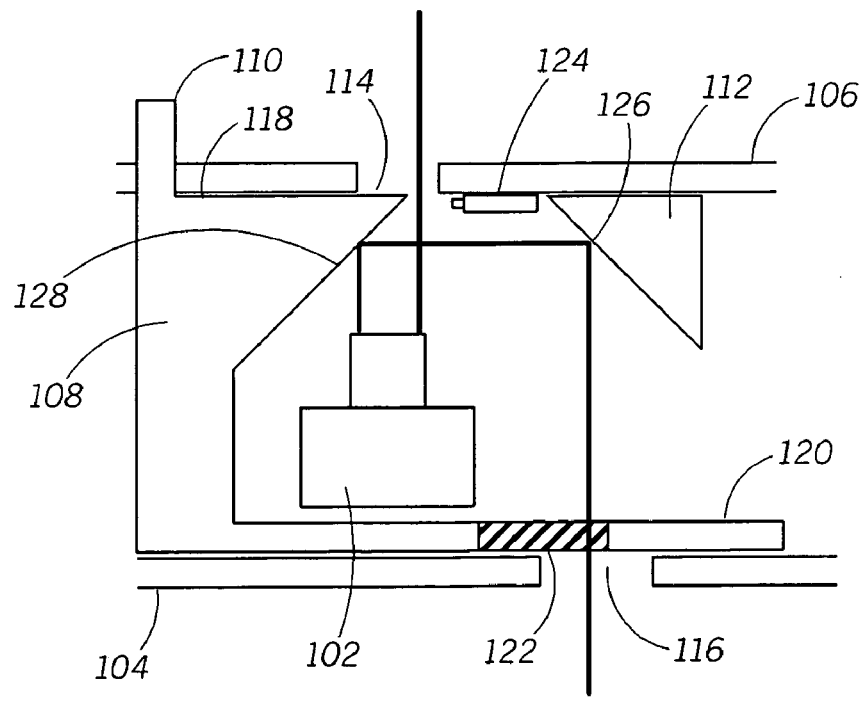
FIG. 4 depicts, in a simplified and representative form, a diagram of a portion of an electronic device showing a camera and moveable assembly in an intermediate position.

Referring to FIG. 4, the electronic device 100 is shown with the movable assembly 108 in a third, intermediate, position that is between the first and second positions, wherein light from both apertures 114, 116 is allowed to enter the electronic. device 100 and impact the camera 102. In this case, the movable assembly 108 and the front panel thereof 118 partially blocks the front aperture 114. Similarly, the rear panel 120 partially blocks the rear aperture 116. The lens 122 directs light to the first mirror 126 which is then directed to the second mirror 128 and into the camera 102. It is expected that in this mode the camera could show a split-screen image or by adjusting the optics of either the lens 122 or the mirrors 126, 128 the image coming from one side, such as the rear 116, could be superimposed with an image coming from the front through the front aperture 114.

Figure 5:
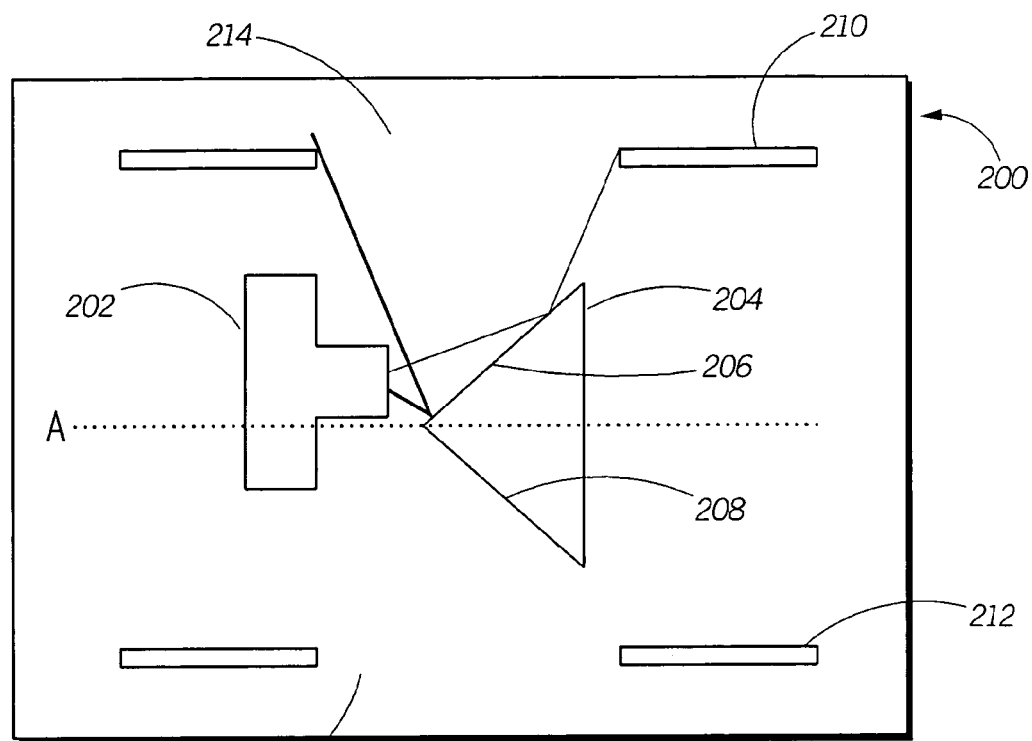
FIG. 5 depicts, in a simplified and representative form, a diagram of a portion of an electronic device showing a moveable camera and mirror assembly in a first position.

Referring to FIG. 5, an electronic device 200 has a camera 202 or a camera optics mounted to a movable assembly (not shown). A mirror mount 204 has a first mirror 206 and a second mirror 208. These components are mounted inside a case having a front housing 210 and a rear housing 212. The housings 210, 212 having corresponding front and rear light apertures 214, 216 disposed therein. As shown in FIG. 4, the camera 202 may be moved to a first position above a reference line A. The reference line is used for the sake of discussion and is shown at a point dividing the first mirror 206 from the second mirror 208. Light entering the front aperture 214 is directed to the camera 202, or the camera optics as the case may be, by the mirror 206. In this embodiment, since a single mirror is used, that is, an odd number of mirrors, the camera or subsequent imaging electronics would be required to reverse the image to correct for the optical reversal caused by the single mirror reflection.

The apertures 214 and 216 may have lenses. The lenses could be adjustable for focusing and adjusting the image captured by the camera 202. The movable assembly (not shown) may have covers which move into place over the apertures 214, 216. Such optional covers are not shown and would be obvious to one of ordinary skill in the art as to the implementation techniques for disposing such covers. The other elements of FIG. 5–7 are known and available, as discussed above.

Figure 6:
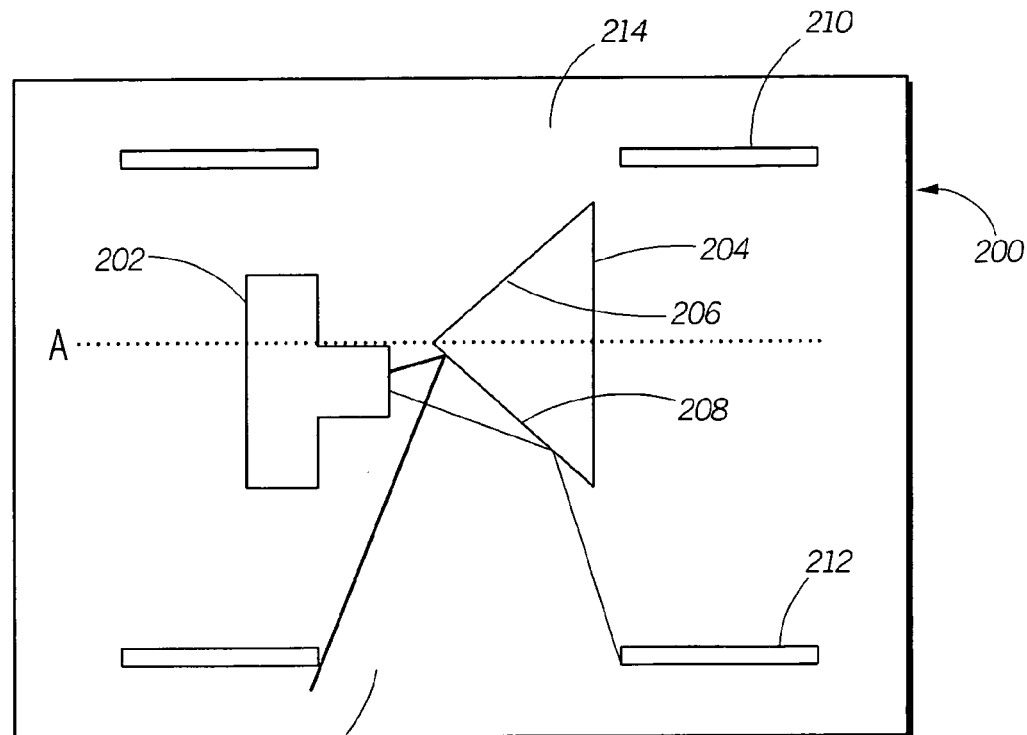
FIG. 6 depicts, in a simplified and representative form, a diagram of a portion of an electronic device showing a moveable camera and mirror assembly in a second position.

Referring to FIG. 6, the camera 202 is shown positioned below the reference line A. Light entering the rear aperture 216 is directed to the camera 202 by the mirror 208. Again, the camera 202 would be required to invert the image since an odd number of mirrors have been introduced into the optical path of the light.

Figure 7:
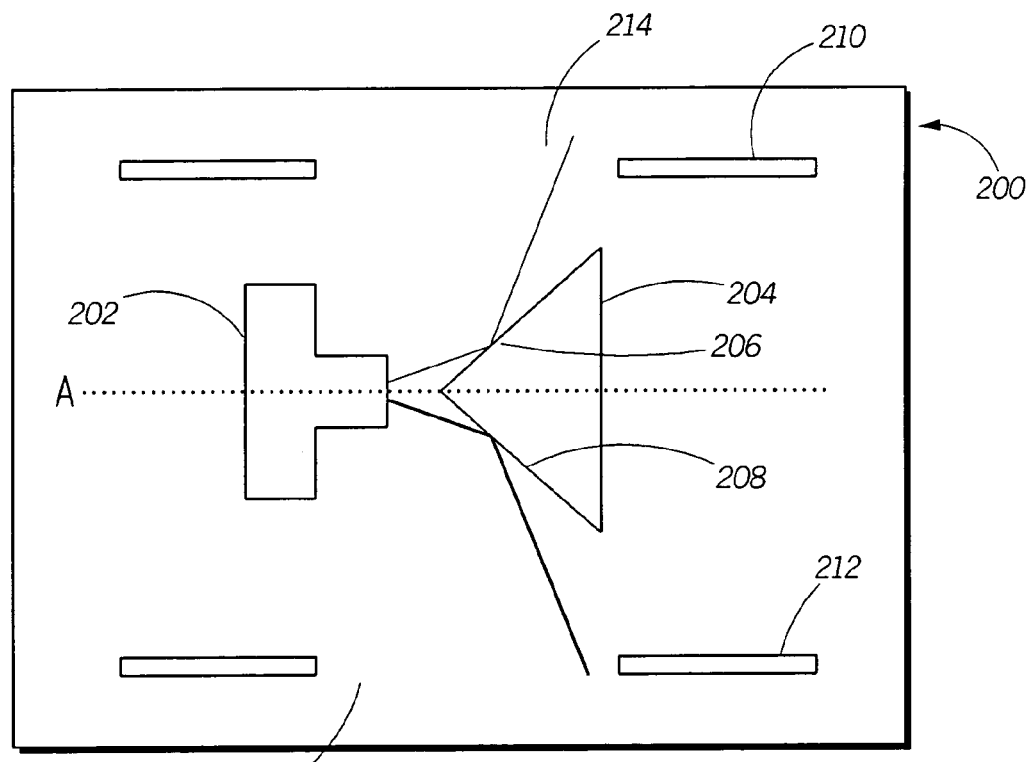
FIG. 7 depicts, in a simplified and representative form, a diagram of a portion of an electronic device showing a moveable camera and mirror assembly in a intermediate position.

Referring to FIG. 7, the camera 202 is moved to a position straddling the reference line A such that light entering the front aperture 214 and light entering the rear aperture 216 are both directed into the camera 202. This would result in, depending on the shape of the mirror and other optics involved, a split image or a superimposed image comprising a scene in front of the camera 202 and a scene at the rear of the camera 202. As above, a detent mechanism (not depicted) or other driven system, such as motorized assembly, may be used to move the camera 202 between the various positions shown and described in FIGS. 5–7. While the camera 202 has been shown as moving in FIGS. 5–7, it will be readily appreciated that the camera 202 may be fixed and the mirror mount 204 may be moved to accomplish the same effect of having light from either aperture 214, 216 directed to the camera 202.

Figure 14:
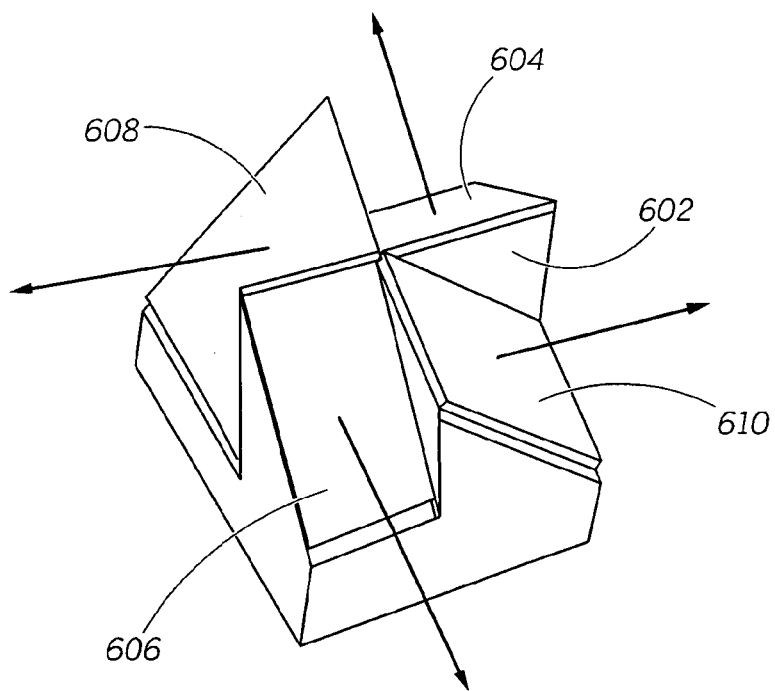
FIG. 14 depicts, in a simplified and representative form, a perspective view of a mirror arrangement having four mirror faces.
Figure 15:
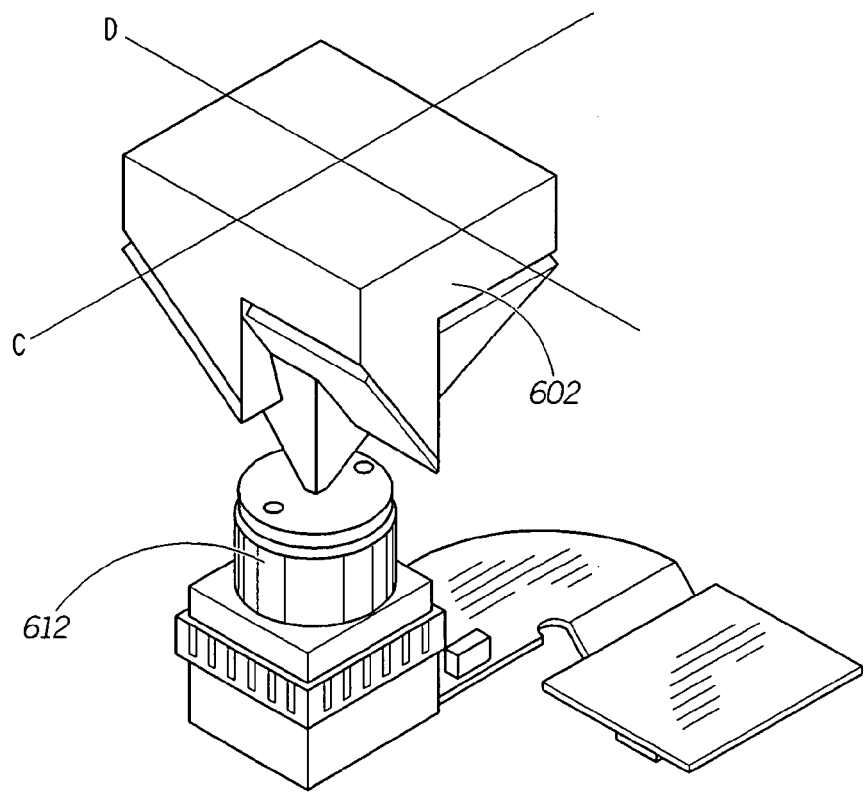
FIG. 15 depicts, in a simplified and representative form, a perspective view of a portion of an electronic device having the mirror arrangement of FIG. 14 mounted above a camera.

Referring to FIG. 14, a mirror arrangement 602 having four mirror faces 604, 606, 608, 610 is shown. The configuration shown in FIGS. 5–7, describes one dimensional movement of either the camera 202 or the mirror mount 204. In this exemplary embodiment, two dimensional movement of the mirror arrangement 602 allows any of the mirrors 604, 606, 608, 610 to be positioned for directing light to an objective point. FIG. 15 shows a partial view of a configuration for using the mirror arrangement 602, mounted above a camera 612. The mirror arrangement 602 (or as discussed above, the camera 612) can be moved in two dimensions along axes "C" and "D." As shown, the mirror arrangement 602 is positioned to allow light from 4 directions to be directed to the camera 612. Operation in such a mode may be useful in teleconferences with multiple attendees at a table or for broadcasting a scene to a web audience.

Figure 8:
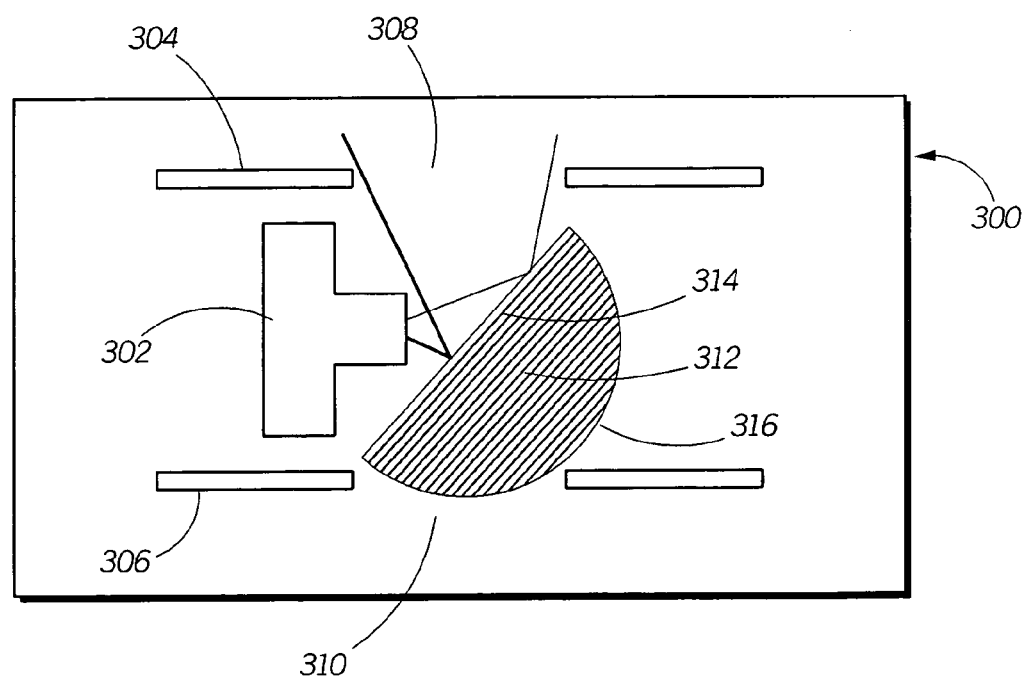
FIG. 8 depicts, in a simplified and representative form, a diagram of a portion of an electronic device showing a camera and alternate moveable assembly in a first position.

Referring to FIG. 8, an electronic device 300 has a camera 302 disposed in a case (not depicted, but the same or similar to the case 101) having a front housing 304 and a rear housing 306. The front housing 304 has an opening or front aperture 308 for permitting light to enter the electronic device 300. The rear housing 306 has a back aperture 310 for allowing light to enter the assembly. A movable assembly 312 has a mirrored front panel 314 and a back panel 316. In the position shown, the back panel 316 blocks light from entering the rear aperture 310 while the mirrored front face 314 allows light entering the front aperture 308 to be directed to the camera 302. In this respect, the back panel 316 operates similarly to the second panel 120 in FIG. 2. The moveable assembly 312 may be as shown, having a semicircular shape or another suited to accomplishing the same goals of blocking one opening while redirecting light entering another opening to a camera, for example, a triangle. The moveable assembly 312 may be constructed of a variety of materials commonly used in personal and consumer electronics. The moveable assembly 312 may be moved by a lever or knob (not shown) attached thereto or driven by a spring, motor or the like. The apertures 308, 310 may each have a lens (not depicted) for either protection of the electronic device 300 internals or for optical correction or both. One or both of the lenses may provide optical correction, such lenses may be fixed or adjustable, an adjustment being ideal for sizing, focusing or special effects. The lens may be removable or replaceable to allow for no correction, different corrections, or for different special effects. Lenses and the differing effects they may invoke are well known in the visual arts, especially with respect to film cameras.

Figure 9:
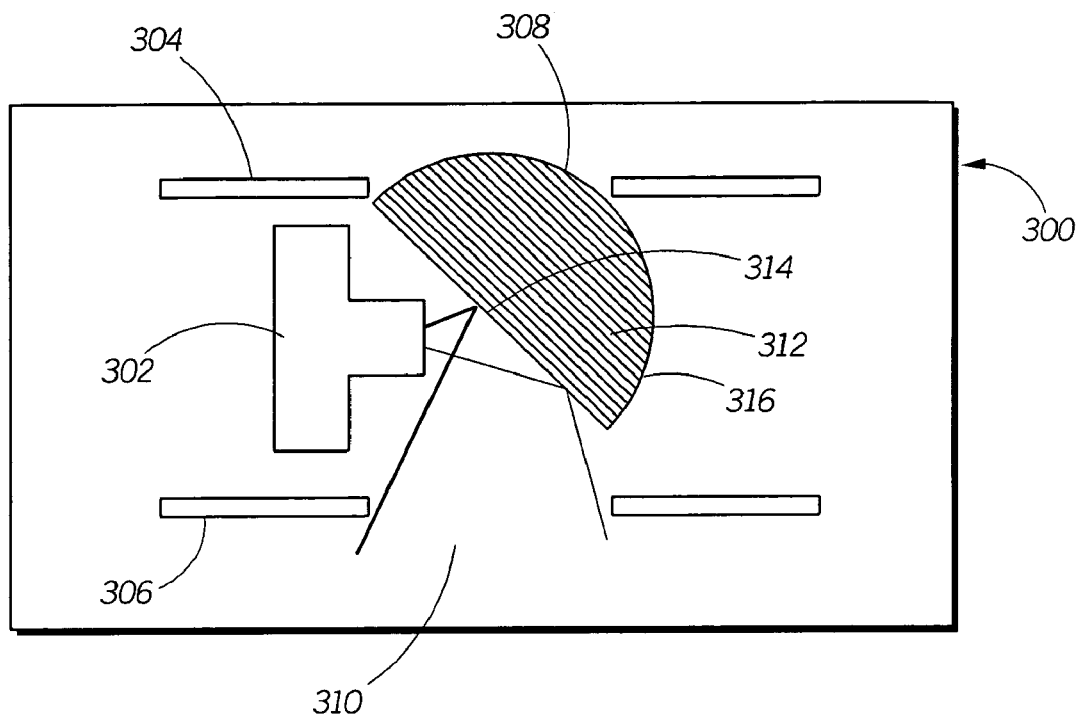
FIG. 9 depicts, in a simplified and representative form, a diagram of a portion of an electronic device showing a camera and alternate moveable assembly in a second position.

FIG. 9 shows the electronic device 300 of FIG. 8 with the movable assembly 312 repositioned so that the back panel 316 now blocks light from entering the front aperture 308 and the mirrored front face 314 directs light from the rear aperture 310 on to the camera 302. In this case, as well as the case of FIG. 8, since there is one, i.e. an odd number of mirrors in the optical path, the camera 302 or the electronics associated therewith must create a mirror image so that the ultimate image displayed to a user has the correct orientation.

Figure 10:
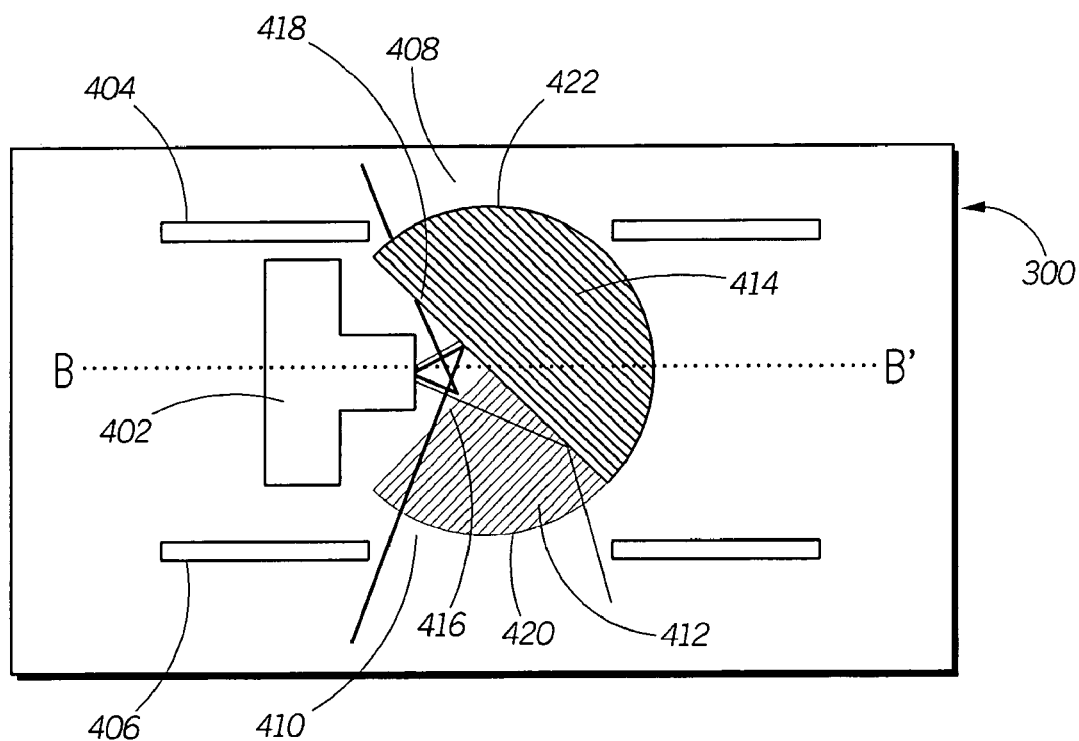
FIG. 10 depicts, in a simplified and representative form, a diagram of a portion of an electronic device showing a moveable camera and alternate mirror arrangement.

Referring to FIG. 10 a diagram of a portion of an electronic device showing a moveable camera and alternate mirror arrangement is discussed and described. An electronic device 400 has a camera 402 disposed inside a case of the electronic device 400. The case (not depicted, but the same or similar to the case 101) is comprised, in one embodiment, of a front housing 404 and a rear housing 406. The housings 404, 406 are disposed with a front aperture 408 and a rear aperture 410. Both apertures 408, 410 allow light to enter the case for the purpose of image capture by the camera 402. The electronic device 400 further includes a first assembly 412 and a second assembly 414. The first assembly 412 has disposed on one side a first mirror face 416. The second assembly 414 has disposed on one side a second mirror face 418. The first and second assemblies 412, 414 each have corresponding back panels 420, 422. The camera 402 is attached to a moveable assembly (not shown) allowing the camera 402 to be moved vertically along an axis perpendicular the first and second mirror faces 416, 418.

Figure 11:
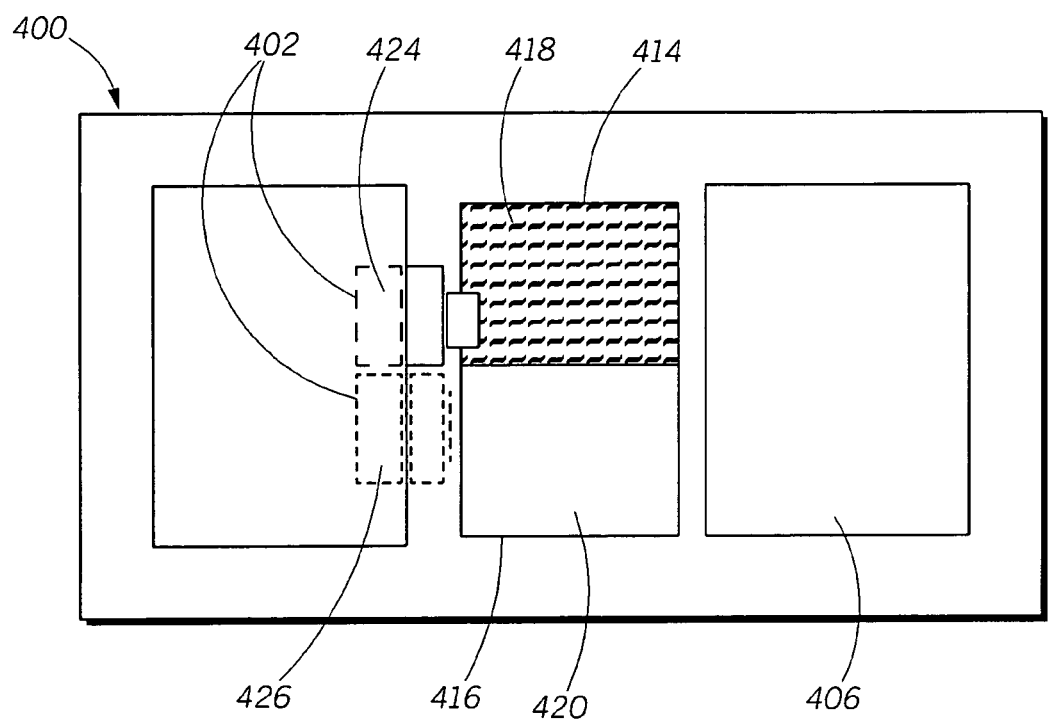
FIG. 11 depicts, in a simplified and representative form, an alternate view of the FIG. 9 assembly showing the moveable camera and alternate mirror arrangement.

Referring to FIG. 11, an alternate view of the FIG. 10 assembly showing the moveable camera 402 and alternate mirror arrangement is discussed and described. The camera 402 is shown in a first position 424. Light entering the electronic device 400 through the rear aperture 410 is directed into the camera 402 by the second mirror face 418. With the camera 402 in a second position 426, light entering the electronic device 400 via the front aperture 408 is directed to the camera 402 by the first mirror face 416.

Figure 12:
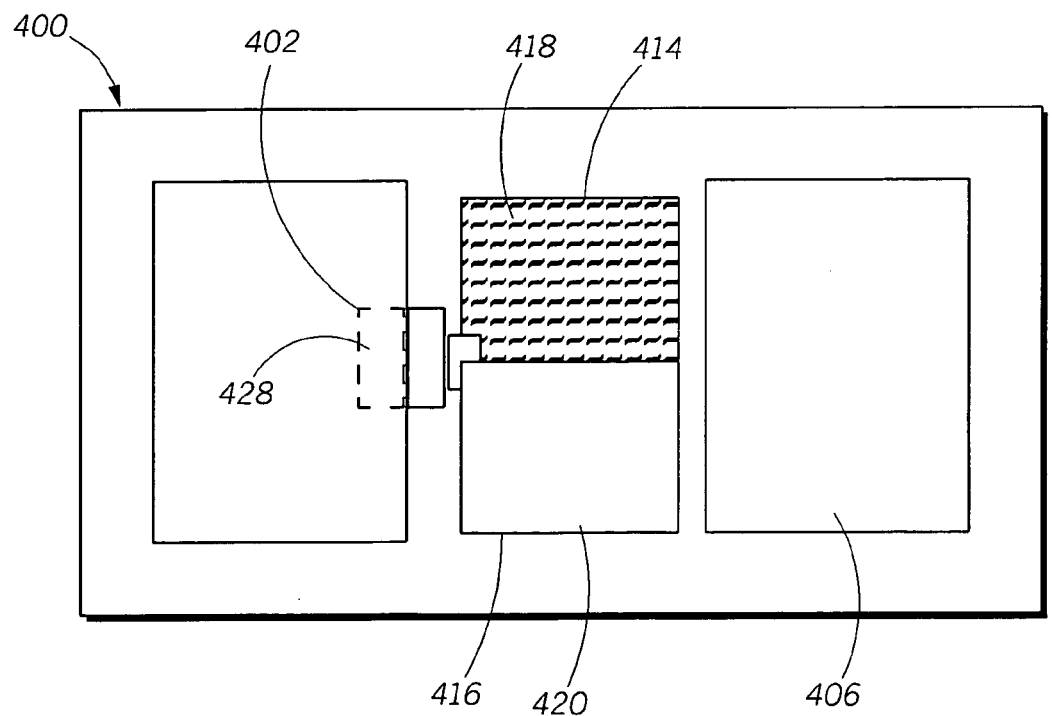
FIG. 12 depicts, in a simplified and representative form, an alternate view of the FIG. 9 assembly showing the moveable camera and alternate mirror arrangement.

Referring to FIG. 12, an alternate view of the FIG. 10 assembly showing the moveable camera 402 and alternate mirror arrangement is discussed and described. The camera 402 is shown in an intermediate position 428. Light entering both apertures 408, 410 is directed by the respective mirror faces 416, 418 to the camera 402 resulting in either a split screen image or a superimposed image, depending on the optics and mirror configurations employed.

While the apertures 408, 410 are disposed on opposite sides of the electronic device 400, there are instances where apertures could be contemplated on adjacent sides or edges of the electronic device, or where an extended moveable assembly and mirrors using the same technique shown here or in combination with those described above can be used to enable image capture from apertures disposed on all sides or faces of an electronic device 400 or combinations of faces.

Figure 16:
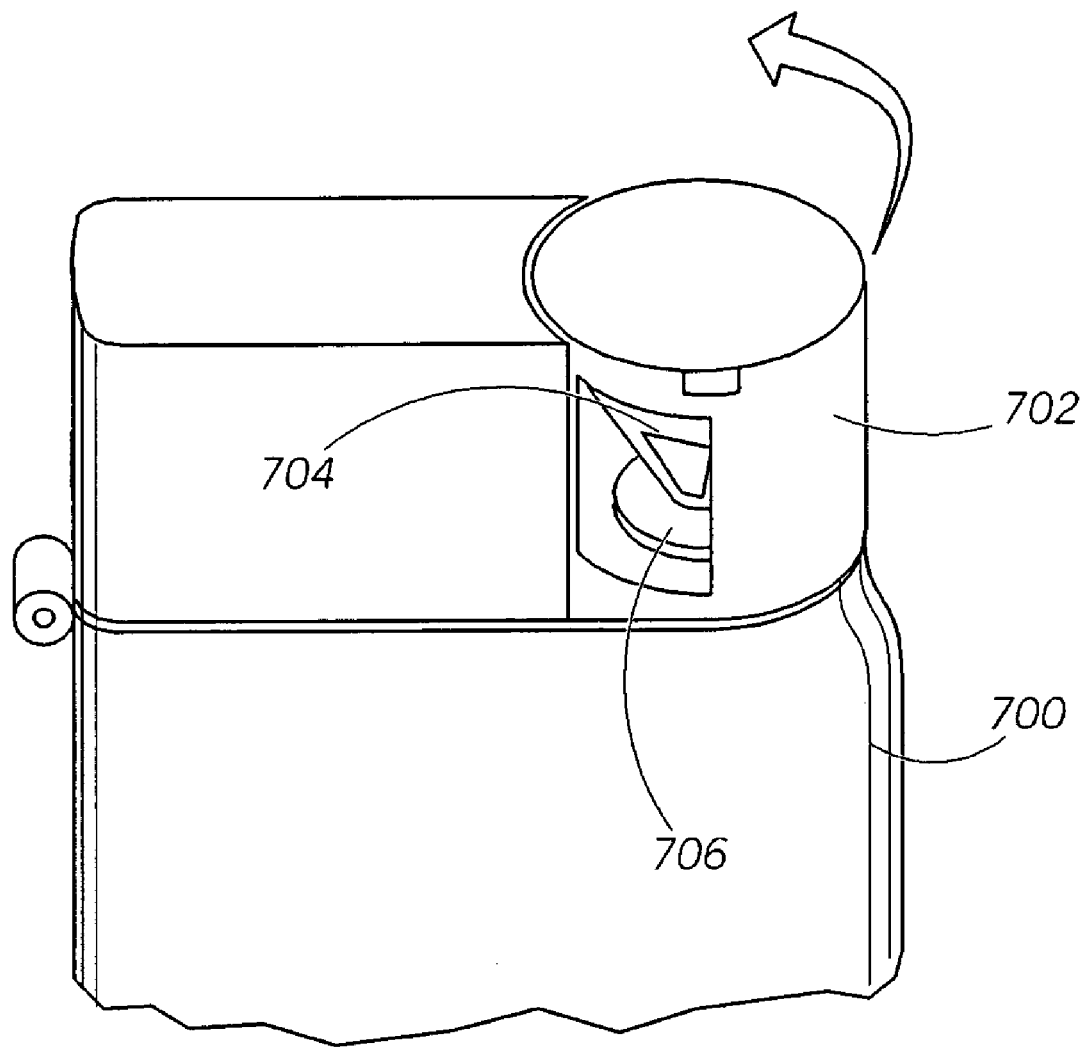
FIG. 16 depicts, in a simplified and representative form, a perspective view of a portion of an electronic device having a rotatable cover and mirror.

Referring to FIG. 16 an electronic device having a rotatable cover and mirror is discussed and described. An electronic device 700 is disposed with a rotatable cover 702. Disposed within the rotatable cover 702 is a mirror 704 or prismatic lens for redirecting light to a camera 706. The mirror 704, prismatic lens or other light redirection apparatus defines an angle in relation to the electronic device 700, the angle being generally perpendicular to the surface of the mirror 704. As the rotatable cover 702 is moved, the angle with respect to the electronic device 700 is changed. In a first position of the rotatable cover light from a first angle relative to the electronic device 700 is directed to the camera 706. When the cover is rotated to a second position, light from a second angle with respect to the electronic device 700 is directed to the camera. The image may be captured and stored or sent as is. In another embodiment, a position sensor (not depicted) informs the camera 706 or another process running in the electronic device 700 to re-orient a captured image so the edges of the captured image will correctly align with the edges of a display (not depicted) used for viewing the captured image, i.e. the top of the scene will be at the top of the display.

Figure 13:
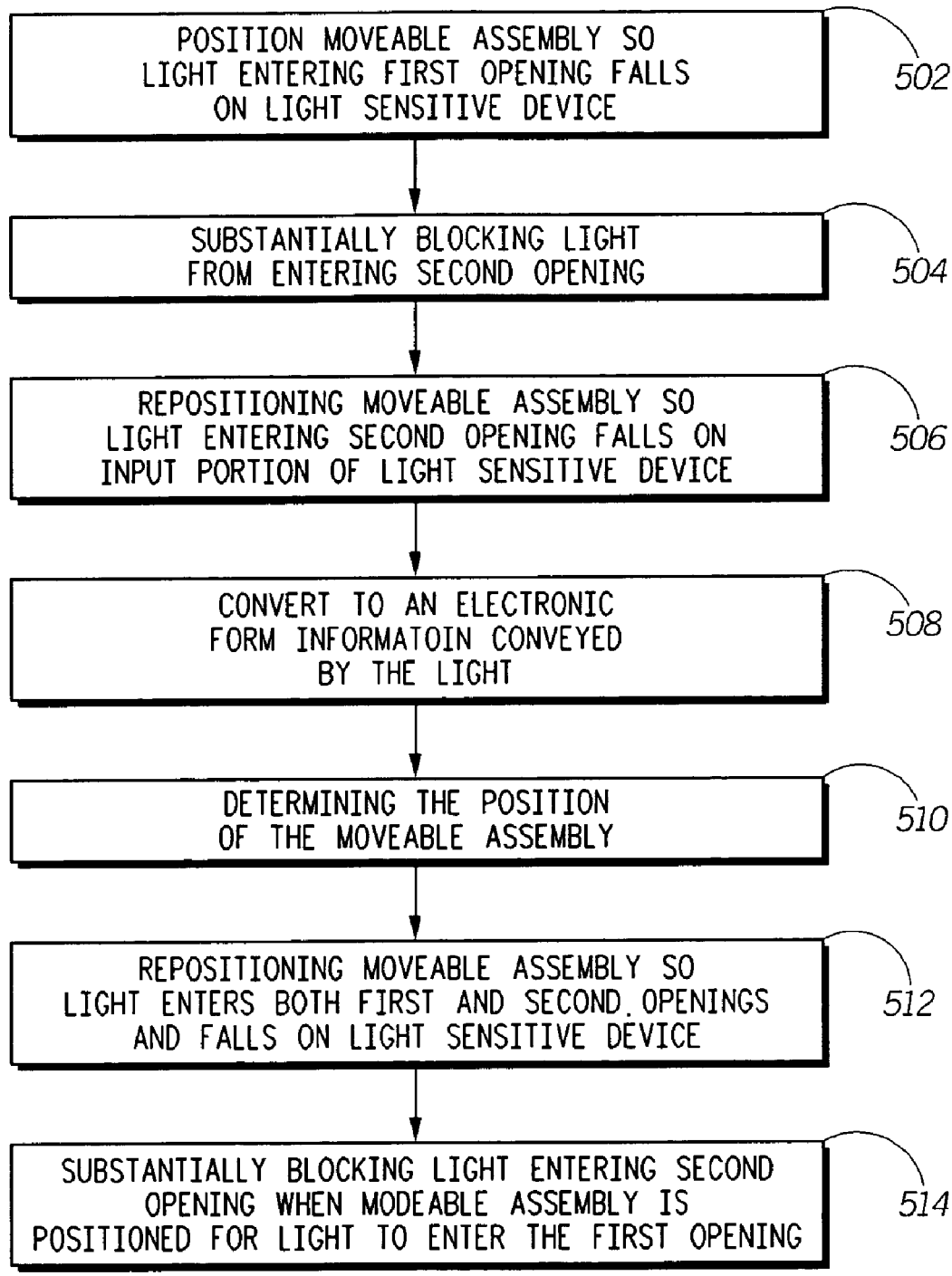
FIG. 13 is a flow chart of a method for using a multidirectional imaging system.

Referring to FIG. 13, a method for using a multidirectional imaging system is discussed and described. An electronic device is provided, the electronic device having a light sensitive device, such as a camera or barcode sensor, and multiple openings in the housing for receiving light. A moveable assembly is positioned 502 so light entering a first opening falls on an input portion of the light sensitive device. A picture may be taken or other information extracted from the light falling on the input sensor.

While in this position light is substantially blocked 504 from entering the second opening. Substantially blocked may be interpreted as blocked to the extent that light entering the second opening does not unacceptably degrade an image captured using light from the first opening. This may vary from application to application, for example, a recreational photo may tolerate more degradation than an image used for optical character recognition of printed text. The moveable assembly may be repositioned 506 so light entering a second opening falls on the input portion of the light sensitive device. In either position of the moveable assembly light entering the selected opening can be converted 508 to an electronic form. The electronic information captured corresponds to information conveyed by the light falling on the input portion of the light sensitive device.

A sensor or other mechanism may be used for determining 510 the position of the moveable assembly. The moveable assembly may be repositioned 512 so light entering both the first and second openings falls on the input portion of the light sensitive device, allowing creation of a split screen image or superimposed image representing scenes or objects captured via both openings.

The apparatus and methods discussed above, and the inventive principles thereof, are intended to and will enhance the use of electronic devices having integrated or embedded imaging devices such as digital cameras. Using the principles of redirecting light from different sources or views will not only simplify the use of such devices but bring a new and novel method of use in the creation of split view and superimposed images. Users benefit by quickly and easily monitoring both self view and observed view images from their electronic device. Manufacturers can benefit by not requiring the expensive and high maintenance mechanical and electrical connections required to rotate the entire housing comprising the camera in current devices. By taking advantage of the ability to electronically create mirror images of captured scenes, inexpensive mirrors can be combined with digital cameras to effect the principles described herein.

It is expected that these embodiments or others in accordance with the present invention will have application to many portable image capture devices. The disclosure extends to the constituent elements or equipment comprising such systems and specifically the methods employed thereby and therein.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

We claim:

1. An electronic device with a camera arranged and constructed for taking pictures from multiple directions with respect to the electronic device comprising:
   a case;
   a moveable assembly moveably coupled to the case, the moveable assembly being moveable between a first position and a second position; and
   a camera coupled to one of the case and the moveable assembly;
   whereby when the moveable assembly is in the first position light entering from a first angle relative to the electronic device strikes the camera and when the moveable assembly is in the second position light entering from a second angle relative to the electronic device strikes the camera,
   wherein the moveable assembly further comprises:
   a first panel for covering a first aperture in the case;
   a second panel for covering a second aperture case; and
   a plurality of light redirection apparatuses for directing light entering one of the first and second apertures to the camera.

2. The electronic device of claim 1 further comprising a sensor for determining a position of the moveable assembly.

3. The electronic device of claim 1 wherein the first panel comprises a portion of the second panel.

4. The electronic device of claim 1 wherein the second panel further comprises a lens for allowing light to enter when the moveable assembly is in the second position, the lens being one of flat, curved and prismatic.

5. The electronic device of claim 4 wherein the lens is adjustable for altering the size of an image captured via the lens.

6. The electronic device of claim 1 wherein one or more of the plurality of light redirection apparatuses is curved.

7. The electronic device of claim 1 wherein when the moveable assembly is in the first position light is blocked from entering the second aperture and when the moveable assembly is in the second position light is blocked from entering the first aperture.

8. The electronic device of claim 1 wherein at least one of the plurality of light redirection apparatuses is attached to the moveable assembly.

9. The electronic device of claim 1 wherein the camera is operable to correct an image captured when the plurality of light redirection apparatuses comprises an odd number of mirrors.

10. The electronic device of claim 1 wherein the first and second apertures are on opposite sides of the case.

11. The electronic device of claim 1 wherein the moveable assembly is rotatably attached to the case.

12. The electronic device of claim 1 wherein the camera is attached to the moveable assembly.

13. The electronic device of claim 1 wherein the moveable assembly being moveable to a third position such that when in the third position light entering from multiple angles with respect to the case strikes the camera.

14. A method for operating an electronic device having a light sensitive device and a case with multiple openings for receiving light comprising:
   positioning a moveable assembly so light entering from a first angle relative to the case falls on an input portion of the light sensitive device;
   repositioning the moveable assembly so light entering from a second angle relative to the case falls on the input portion of the light sensitive device;
   determining a position of the movable assembly using a sensor for determining a position of the moveable assembly; and
   converting to an electronic form information conveyed by said light entering one of the first and second angles and falling on the input portion of the light sensitive device.

15. The method of claim 14 further comprising:
   repositioning the moveable assembly so light entering both the first and angles falls on the input portion of the light sensitive device.

16. The method of claim 14 further comprising:
   substantially blocking light from entering at the second angle when the moveable assembly is positioned for light entering at the first angle to fall on the input portion of the light sensitive device.

17. A wireless communication device with a camera arranged and constructed for taking pictures from multiple angles with respect to the wireless communication device comprising:
   a case;
   a moveable assembly moveably coupled to the case, the moveable assembly having a first position and a second position;
   a camera coupled to one of the case and the moveable assembly; whereby when the moveable assembly is in the first position light entering at a first angle strikes the camera and when the moveable assembly is in the second position light entering at a second angle strikes the camera; and
   a sensor for determining the position of the moveable assembly.

18. The wireless communication device of claim 17 wherein the moveable assembly further comprises one or more light redirecting apparatuses for directing light to the camera and the camera is operable to correct an image captured when the one or more light redirecting apparatuses comprises an odd number of reflective surfaces.

* * * * *